United States Patent
Laux

(10) Patent No.: US 8,689,699 B2
(45) Date of Patent: Apr. 8, 2014

(54) ELEVATED BICYCLE-BASED TRANSPORTATION SYSTEM, CONNECTION APPARATUS FOR BICYCLE AND MODIFIED BICYCLE

(76) Inventor: Kenneth Laux, Bloomington, IN (US)

(*) Notice: Subject to any disclaimer, the term of this patent is extended or adjusted under 35 U.S.C. 154(b) by 234 days.

(21) Appl. No.: 13/128,337

(22) PCT Filed: Nov. 17, 2009

(86) PCT No.: PCT/US2009/064799
§ 371 (c)(1),
(2), (4) Date: May 9, 2011

(87) PCT Pub. No.: WO2010/059629
PCT Pub. Date: May 27, 2010

(65) Prior Publication Data
US 2011/0214587 A1    Sep. 8, 2011

Related U.S. Application Data

(60) Provisional application No. 61/199,574, filed on Nov. 18, 2008.

(51) Int. Cl.
*B61B 7/06*    (2006.01)
(52) U.S. Cl.
USPC .......................................... 104/112; 105/150
(58) Field of Classification Search
USPC .............. 104/53, 89, 91, 93, 112, 115, 173.1; 105/95, 142, 146, 147, 148, 150
See application file for complete search history.

(56) References Cited

U.S. PATENT DOCUMENTS

| | | | |
|---|---|---|---|
| 488,200 A | 12/1892 | Hotchkiss | |
| 526,832 A | 10/1894 | Gardner | |
| 550,878 A | 12/1895 | Gilman | |
| 563,793 A | 7/1896 | Nickerson | |
| 599,697 A * | 3/1898 | Foster | 105/91 |
| 600,371 A | 3/1898 | May | |
| 638,296 A * | 12/1899 | Talbot | 105/95 |
| 638,822 A | 12/1899 | Turner | |
| 693,128 A | 2/1902 | Gorneman | |
| 844,116 A | 2/1907 | Francovich | |

(Continued)

FOREIGN PATENT DOCUMENTS

| | | |
|---|---|---|
| JP | 57-052358 | 3/1982 |
| JP | 2002-225780 | 8/2002 |

*Primary Examiner* — Zachary Kuhfuss
(74) *Attorney, Agent, or Firm* — Greer, Burns & Crain, Ltd.

(57) ABSTRACT

An elevated bicycle-based transportation system comprises a bicycle, a front suspension member, connected to a front portion of the bicycle and having on the upper end a rolling, sliding, or gliding member, a rear suspension member, connected to a rear portion of the bicycle and having on the upper end a rolling, sliding, or gliding member, and an overhead track, which is a supporting member substantially horizontal in orientation, on which the rolling, sliding or gliding members of the suspension members rest. When suspended in this way, the bicycle can be ridden along the overhead track. When the suspension members are not suspended from the overhead track, the bicycle can be used in the normal manner, and at least one of the suspension members can be retracted, collapsed, folded, pivoted, detached, or otherwise modified by a simple operation, to be made less prominent.

16 Claims, 18 Drawing Sheets

(56) References Cited

U.S. PATENT DOCUMENTS

| | | |
|---|---|---|
| 4,649,588 A | 3/1987 | Taylor |
| 4,928,601 A | 5/1990 | Harder |
| 5,461,984 A | 10/1995 | Andress, III |
| 5,566,621 A | 10/1996 | Wanvik |
| 2006/0284389 A1 | 12/2006 | Cheney et al. |

* cited by examiner

PRIOR ART

US 8,689,699 B2

ELEVATED BICYCLE-BASED TRANSPORTATION SYSTEM, CONNECTION APPARATUS FOR BICYCLE AND MODIFIED BICYCLE

RELATED APPLICATION

This application claims priority pursuant to 37 CFR 119(e) from U.S. Provisional Application No. 61/199,574 filed Nov. 18, 2008.

TECHNICAL FIELD

This invention relates to an elevated bicycle-based transportation system, and in particular to an elevated bicycle-based transportation system which employs modified bicycles for elevated transportation, as well as to a connection apparatus for a bicycle in such a system, a modified bicycle for use in such a system.

BACKGROUND ART

In the dozen or so decades since their appearance, bicycles have become one of the most ubiquitous machines on earth, being used by many millions around the world as a reliable and inexpensive means of transportation. Bicycles, and variations on the traditional two-wheel upright bicycle such as recumbent bicycles, tandem bicycles, tricycles, and electric bicycles, are typically much cheaper than automobiles, yet can be used to travel distances sufficient to make the bicycle a satisfactory means of commuting, traveling to and from school, shopping, and performing many other tasks.

However, bicycles are not without drawbacks. Bicycles must often be ridden on roads intended for trucks and automobiles, and in such situations a bicycle rider is exposed to constant danger. Hence, there is the problem with conventional bicycles that the rider often must ride alongside trucks and automobiles, and is in danger of being struck by and even seriously injured or killed by such vehicles.

Also, bicycles are ill-suited to adverse road conditions, and cannot conveniently, easily or safely be used where the ground is covered with snow and ice, deep mud, debris with sharp edges such as broken glass, or obstructions such as rocks or branches. Thus, conventional bicycles have the problem that travel on surfaces under such adverse conditions is often inconvenient, difficult, or unsafe.

Moreover, because the tires of a bicycle travel over road and other surfaces which are often rough and uneven, the rider must often use excessive force when pedaling to propel the bicycle forward. Thus, there is the further problem of human-powered bicycles of the prior art that considerable exertion is sometimes necessary to travel over rough or uneven roads or terrain.

Moreover, when riding a bicycle on a sidewalk, or on an edge of a street, or on various other routes, various obstructions may oblige the rider to ride slowly or to brake often. Hence, there is the further problem with conventional bicycles that the speed with which the bicycle can be ridden is often much slower than would be attainable in the absence of obstructions.

Moreover, bicycles can as a rule only be ridden on reasonably flat surfaces. Hence, there is the further problem with conventional bicycles that some obstructions, such as low fences, streams, flower beds, guardrails, and the like, cannot be traversed at all.

Also, when urban designers undertake to construct a bicycle path or other space specifically for bicycle riders, in order to mitigate some of the above problems such as the problem of safety, there occurs the further problem that space in urban environments is scarce and valuable, so that often only a very limited amount of space can be dedicated solely to bicyclists.

In addition, when bicycles share space on roads with trucks and automobiles, congestion often results, due to the coexistence of different modes of transportation, with their different modes of behavior. Hence, there is the further problem that bicycle use on roadways intended for vehicular traffic often results in traffic congestion.

In U.S. Pat. No. 638,822 and U.S. Pat. No. 693,128, bicycles are disclosed which have been extensively modified to enable travel on the two rails of ordinary railroad tracks, with three arms extending from one side of the bicycle and supported by a wheel which rests on one rail, while the two wheels of the bicycle are modified to enable travel on the other rail. However, in addition to being limited only to travel on railroad tracks, such modified bicycles have the disadvantage of requiring extensive modifications using long and cumbersome members which could not easily be attached and detached or carried. Similar modified bicycles with less cumbersome modifications have been disclosed, as in for example U.S. Pat. No. 5,461,984, but travel is again limited to railroad tracks.

In for example U.S. Pat. No. 563,793, incorporated by reference herein, an aerial bicycle is disclosed which is designed to be hung from an elevated track and ridden. Such an apparatus enables travel elevated above the ground, but the aerial bicycle disclosed is a dedicated vehicle which can only be used in conjunction with the elevated track described. Other bicycles intended for use on a purpose-built elevated track but which cannot be used, or cannot easily be used, as ordinary bicycles are for example disclosed in U.S. Pat. No. 550,878, U.S. Pat. No. 488,200, U.S. Pat. No. 844,116, U.S. Pat. No. 526,832, and U.S. Pat. No. 600,371, all of which are incorporated by reference.

There have also been disclosed elevated paths or roads intended specifically for bicycles, as for example in U.S. Pat. No. 4,649,588; but such structures, while enabling elevated travel using ordinary bicycles, are comparatively large and expensive, and typically provide no means for guiding bicycles and riders on a narrow path.

U.S. Pat. No. 638,296 discloses a bicycle trolley car, in which a bicycle is used in an elevated mode, riding along an overhead trolley wire or rail, and propelled by the rider.

U.S. Patent Application Publication No. 20060284389 discloses a tracked bicycle, which has been converted for use on snow, sand, mud, or similar. However, the conversion process is attended with difficulty, and such a vehicle remains on the ground, and so subject to difficulties presented by such as uneven terrain and large obstructions.

U.S. Pat. No. 599,697 discloses a human-powered vehicle which can be ridden either on the ground, or suspended from an overhead track, thereby resolving a number of the problems of the prior art noted above.

The present invention was devised in light of the above problems, and has as an object the provision of a system of transportation employing bicycles which secures greater safety for the bicycle rider, while not impeding use of the bicycle as an ordinary bicycle.

SUMMARY OF THE INVENTION

An elevated bicycle-based transportation system is provided, including a bicycle, a front suspension member connected to a front portion of the bicycle and having on the upper end a rolling, sliding, or gliding member, a rear suspension member connected to a rear portion of the bicycle and having on the upper end a rolling, sliding, or gliding member, and an overhead track, which is a supporting member substantially horizontal in orientation, on which the rolling, sliding or gliding members of the front suspension member and rear suspension member rest.

When the suspension members are not suspended from the overhead track, notwithstanding the presence of the suspension members, the bicycle can be used in the normal manner.

The suspension members are of such lengths, relative to the height off the ground of the overhead track, the dimensions of the bicycle, and the positions of connection to the bicycle of the front and rear suspension members, that the tires of the bicycle are raised off the ground, so that the bicycle can travel, suspended in air and bearing a human bicycle rider by means of the front and rear suspension members, along the overhead track.

When the bicycle is used as an ordinary bicycle, at least one among the front suspension member and the rear suspension member can be retracted, collapsed, folded, pivoted, detached, or otherwise modified by a simple operation, to assume a less prominent position which does not impede normal use of the bicycle.

In an elevated bicycle-based transportation system, it is preferable that a power transmission system be further provided, which transmits power from a wheel of the bicycle either to a rolling, sliding, or gliding member of a suspension member, or to a separately provided propulsion member such as a fan, and that the bicycle be propelled forward, together with the rider and the front and rear suspension members, along the overhead track, by pedaling the pedals of the bicycle.

In an elevated bicycle-based transportation system, it is preferable that, while the bicycle is ridden suspended from the track, at least one among the front suspension member and the rear suspension member be rigid in the lateral direction, which is the horizontal direction perpendicular to the direction of the track, beginning at the point of connection to the bicycle and continuing at least until substantially above the height of the combined center of gravity of the bicycle, bicycle rider, and suspension members.

In an elevated bicycle-based transportation system, it is preferable that the front suspension member and the rear suspension member be connected to the axle of the front wheel of the bicycle and to the axle of the rear wheel of the bicycle, respectively.

In an elevated bicycle-based transportation system, it is preferable that a front strut, one end of which is connected to the front suspension member, and a rear strut, one end of which is connected to the rear suspension member, be further comprised, such that, by connecting the other ends of each strut to appropriate structural members of the bicycle, motion of the suspension members in the forward/backward direction, which is the direction of travel of the bicycle or in the opposite direction, is prevented.

In an elevated bicycle-based transportation system, it is preferable that the front strut and the rear strut can be adjusted so as to adjust the angles of the suspension members with respect to the vertical direction.

In an elevated bicycle-based transportation system, it is preferable that the overhead track be a cable, a rail, or a raceway.

A connection apparatus is provided for installation on a bicycle, including a plurality of connection members, which are installed on a bicycle to either permanently connect, or facilitate easy temporary connection of, front and rear suspension members, to enable use of the bicycle in the present elevated bicycle-based transportation system.

A modified bicycle includes either the connection apparatus described above, or front and rear suspension members described above, enabling use in the present elevated bicycle-based transportation system, but without impeding use as an ordinary bicycle.

An elevated track is provided, including a cable, a rail, or a raceway, elevated several feet or more off the ground, to enable use of a modified bicycle in the present elevated bicycle-based transportation system.

DESCRIPTION OF THE PREFERRED EMBODIMENTS

Figure 1:
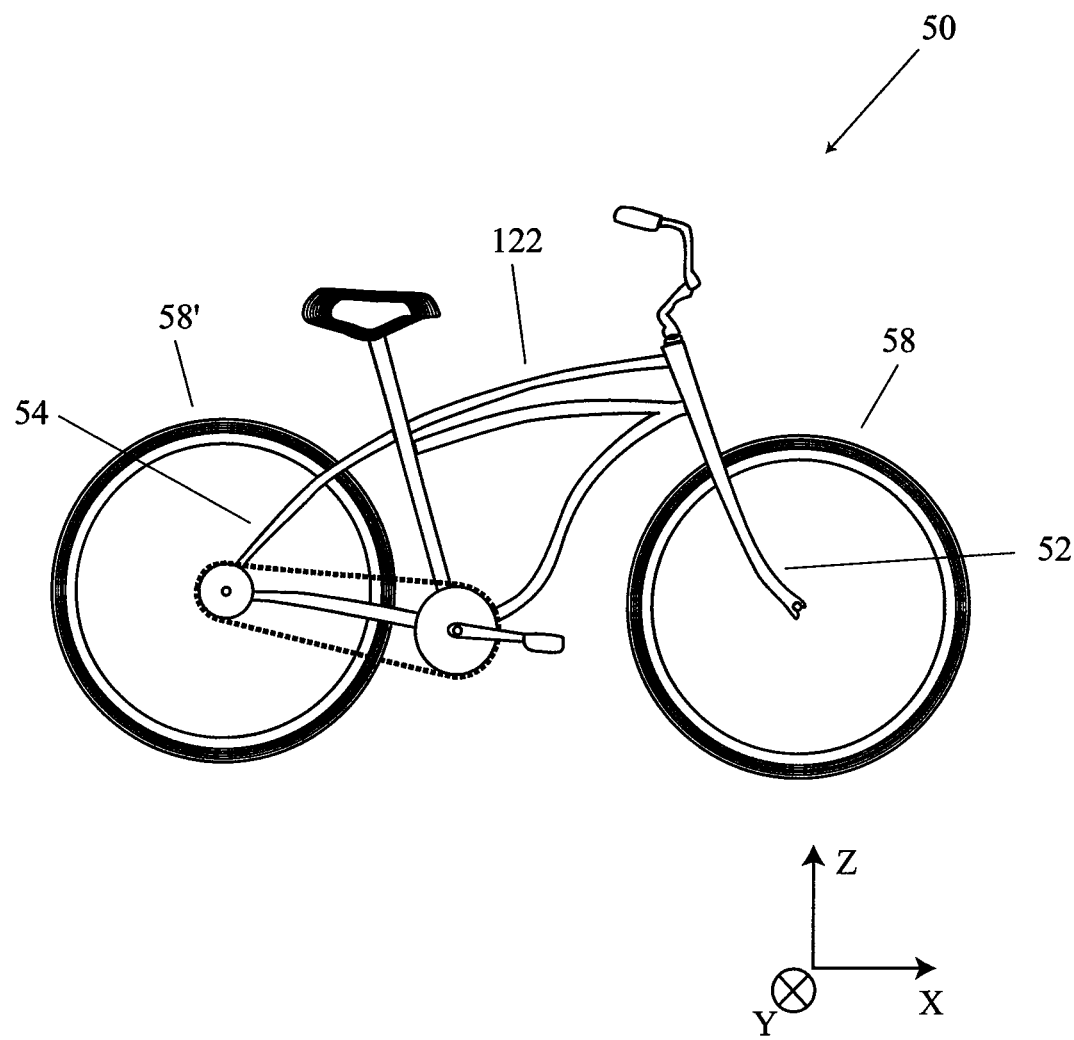
FIG. 1 is a schematic diagram of an ordinary bicycle of the prior art.

FIG. 1 is a schematic diagram of an ordinary bicycle 50 of the prior art which is suitable for use with the present elevated system. For clarity, the wheel spokes, brake cables, and other members not relevant to the invention are not shown. The bicycle 50 includes a front fork 52 and a rear or seat stay 54. Also, in this specification a Cartesian coordinate system is employed in which, as indicated in the bottom-right corner of FIG. 1, the X-axis direction is the horizontal direction of motion of the bicycle, with the positive X direction denoting the forward direction (rightward in the figure); the Y-axis direction is the horizontal direction perpendicular to the X-axis direction (the direction into the plane of the paper), with the positive Y direction denoting the leftward direction of a rider 56; and the Z-axis direction is the vertical direction, with the positive Z direction denoting the upward direction.

Figure 2:
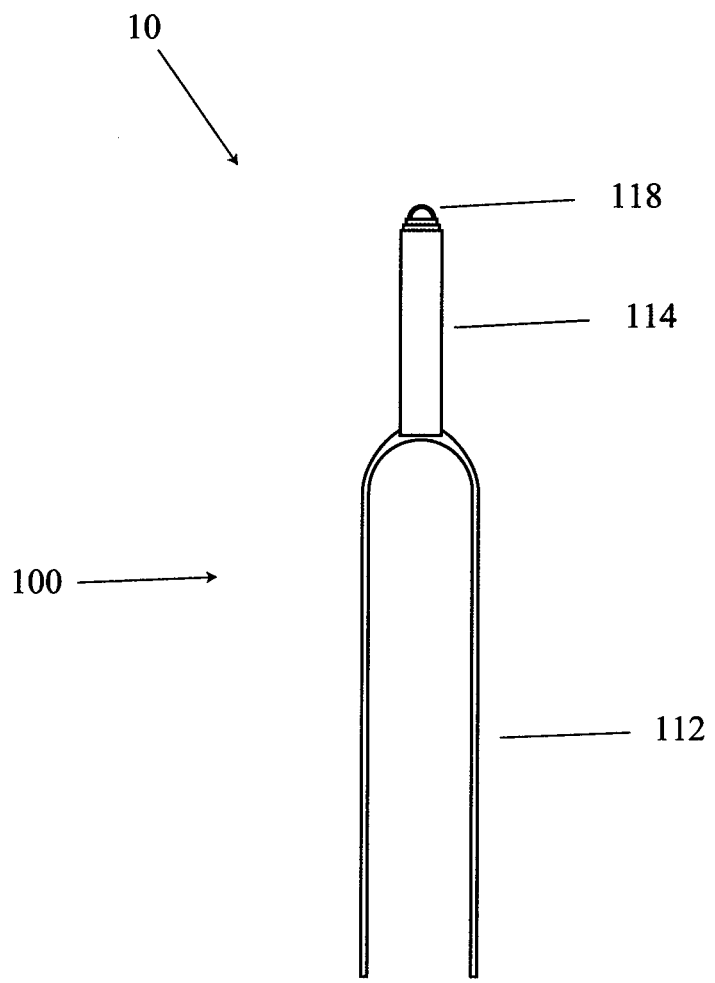
FIG. 2 is a schematic front view of a connection member in the elevated bicycle-based transportation system of a first aspect of the invention.
Figure 3:
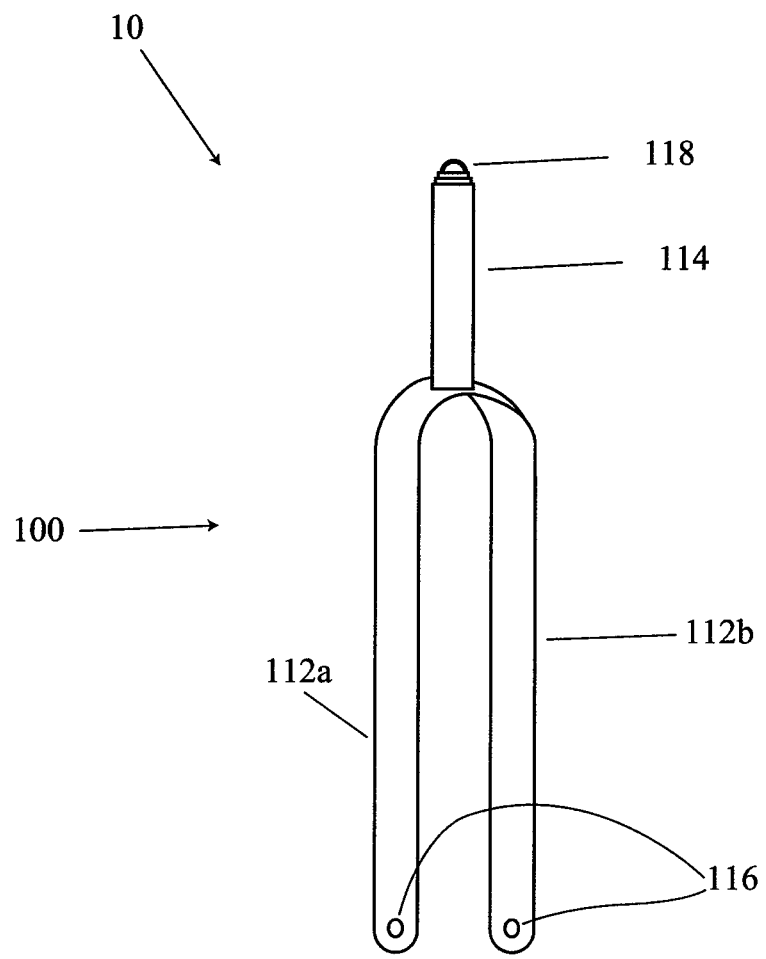
FIG. 3 is a schematic perspective view of the connection member of FIG. 2.
Figure 6:
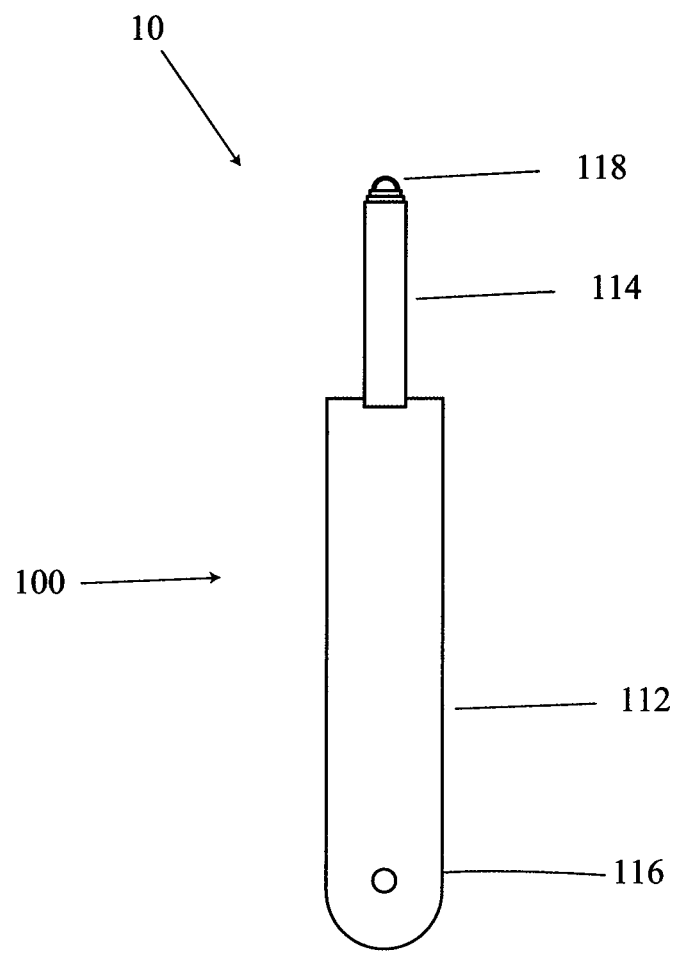
FIG. 6 is a schematic side view of the connection member of FIG. 2.

FIG. 2 shows a connection member 100 in a first aspect of an elevated bicycle-based transportation system of this invention, generally designated 10. The connection member 100 comprises an auxiliary fork 112, a telescoping member 114, and a grommet 118. The telescoping member 114 is made of several axially aligned telescoping segments and is joined at a lower end to the auxiliary fork 112. FIG. 3 and FIG. 6 are a perspective view and a side view, respectively, of the connection member 100. As shown in FIG. 3 and FIG. 6, axle holes 116 are opened in lower extremities of two prongs 112a, 112b of the auxiliary fork 112. The auxiliary fork 112 is preferably formed from a lightweight metal or engineering plastic of suitable strength. The telescoping member 114 may similarly be formed from a lightweight metal or engineering plastic of suitable strength, and the lower end of the telescoping member 114 is securely fastened to the upper end of the auxiliary fork 112, while the other end can be telescoped or extended. The grommet 118 is securely attached to an upper end of the telescoping member 114.

Figure 4:
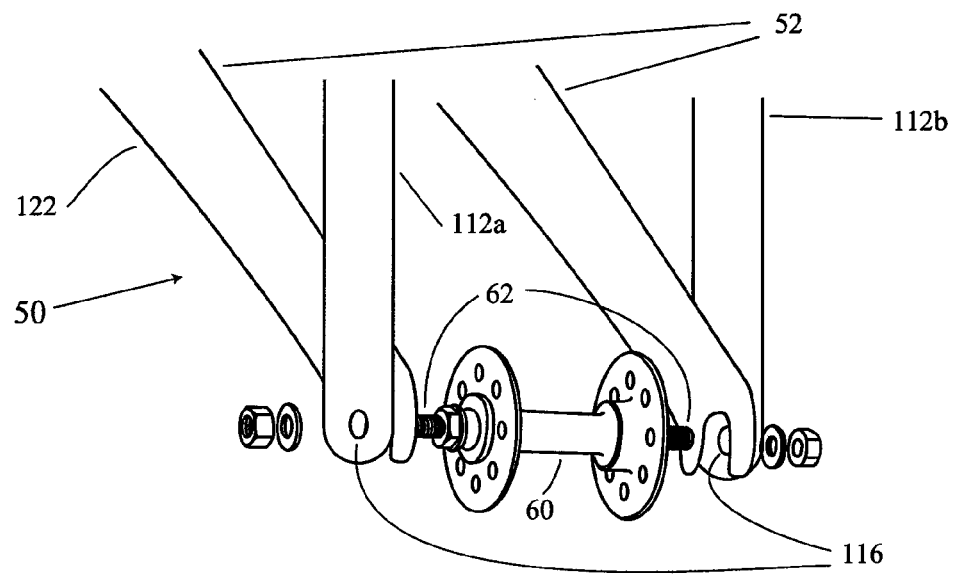
FIG. 4 is an exploded fragmentary perspective view of a front connection member connected to the front fork of a bicycle in the first aspect.

Referring now to FIG. 4, the connection member 100 serving as a front connection member is installed on the bicycle 50. A hub 60 includes an axle 62 of a front wheel 58 that is passed through the axle holes 116 of the auxiliary fork 112, which is preferably positioned on the outside of the front fork 52 of the bicycle 50, and secured in place with nuts and washers, or by other suitable means. It is contemplated that the relative positions of the ends of the auxiliary fork 112 may vary relative to the front fork 52 depending on the situation.

Figure 5:
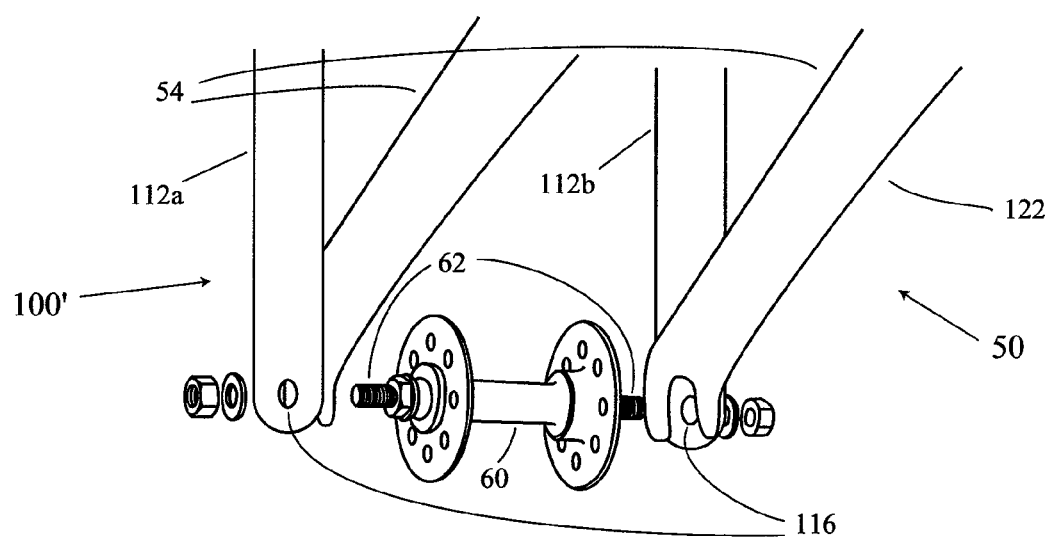
FIG. 5 is an exploded fragmentary perspective view of a rear connection member connected to the seat stay of a bicycle in the first aspect.

Referring now to FIG. 5, similarly, a rear connection member 100' is installed on the bicycle 50 as illustrated in the schematic perspective view of FIG. 5. The axle 62 of the rear wheel 58' is inserted into a hub 60 and passed through the axle holes 116 of the auxiliary fork 112, which is preferably positioned on the outside of the seat stay 54 of the bicycle frame, and secured in place with nuts and washers, or by other suitable means. It is also contemplated that the relative positions of the ends of the auxiliary fork 112 on the rear connection member may vary relative to the seat stay 54 depending on the situation.

Figure 7:
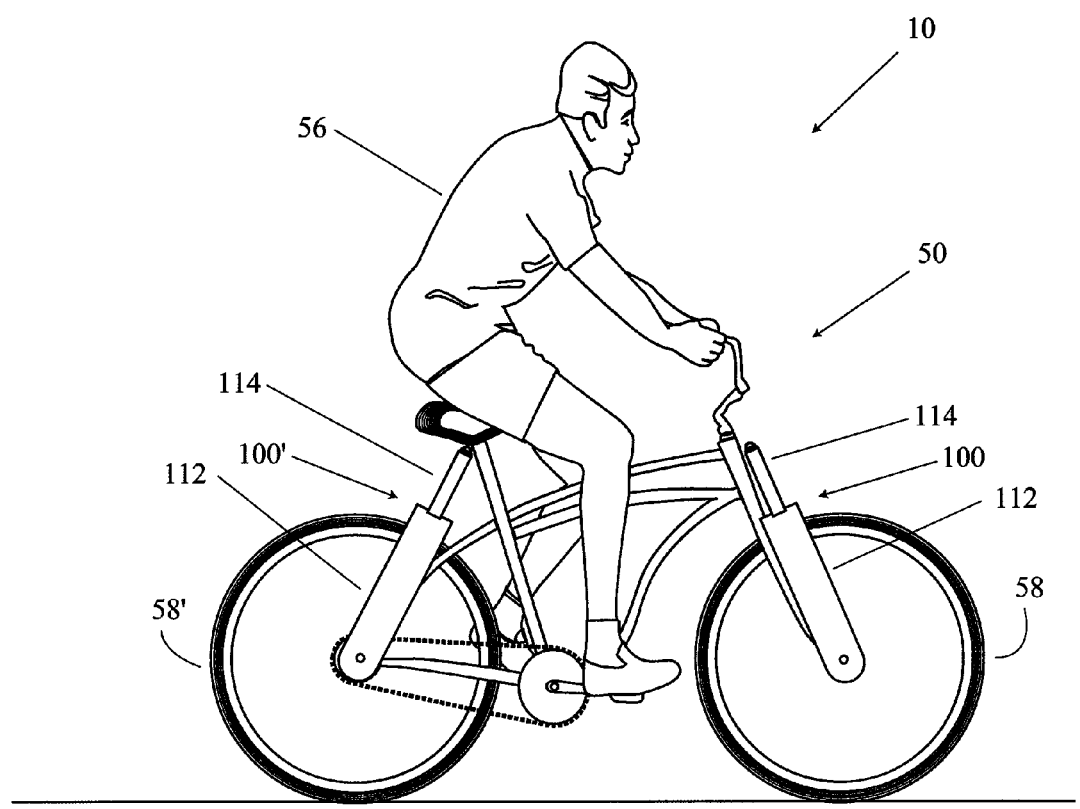
FIG. 7 is a schematic side view of the bicycle of the first aspect, with front and rear connection members installed, and being ridden in the normal mode by a rider.

Referring now to FIG. 7, when installed in this manner, the front and rear connection members 100, 100' are substantially rigid in the Y-axis direction, but can pivot about the axles of the respective wheels. In FIG. 7 the bicycle 50 of this first aspect is shown being ridden by the rider 56, with the front and rear connection members 100, 100' installed and pivoted inward (towards the rear in the case of the front connection member 100, and towards the front in the case of the rear connection member 100'), with telescoping members 114 collapsed.

Figure 8:
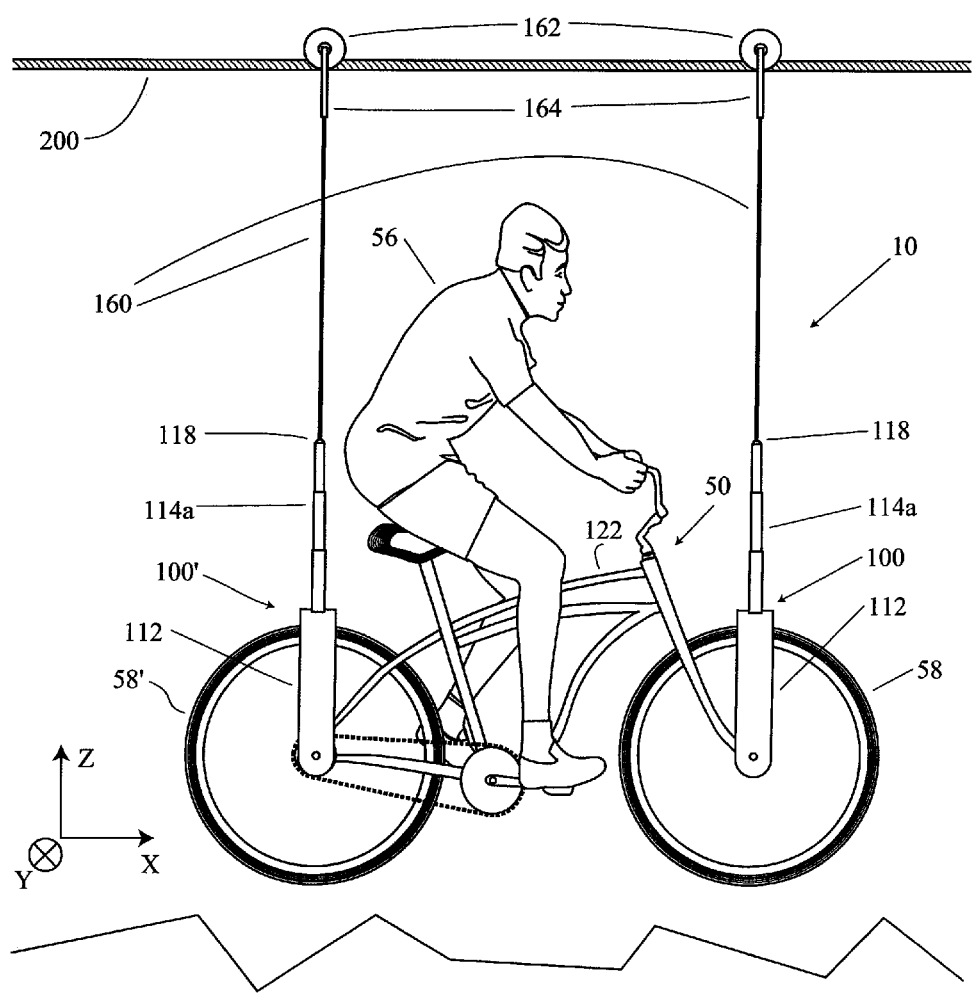
FIG. 8 is a schematic side view of the elevated bicycle-based transportation system of the first aspect, with front and rear connection members installed, extended, and connected to an overhead track, and being ridden in the elevated mode by a rider.

FIG. 8 shows the bicycle 50 of this first aspect, with front connection members deployed for riding in the elevated mode, connected at the grommets 118 to one end of vertical suspension members 160, which may be either rigid members, or flexible members such as cables. The lower ends of the vertical suspension members 160 may be securely fastened to the grommets 118 by for example S-shaped hooks, carabiners, or similar fasteners. Opposite ends of the vertical suspension members 160 are connected to overhead wheel arms 164, which are each rotatably connected to overhead wheels 162; the overhead wheels rest on an overhead cable 200 which serves as a track. The telescoping members 114a are designated as being in the extended position. The overhead cable 200 is supported by appropriate structure (not shown), such as periodically spaced columns, so as to be positioned, for example, approximately two meters above the ground. In the preferred embodiment, the overhead cable 200 has a length of, for example, 10 kilometers, however the length may vary to suit the application.

When the vertical suspension members 160 are cables, they are coilable for greater convenience in storing and carrying, together with the overhead wheels 162 and overhead wheel arms 164, when the bike 50 is being ridden in the normal mode. The overhead wheels 162 each have an outer rim with a grooved or concave shape in the manner of a pulley wheel, so as to accommodate the approximately cylindrical cross-sectional shape of the overhead cable 200, such that the wheels remain reliably on the overhead cable 200. In the preferred system 10, the overhead wheel arms 164 are present on only one side of the overhead wheels 162, such that the support structure of the overhead cable 200 can be positioned on the opposite side (the positive Y-axis side) of the overhead cable 200, to avoid impeding travel of the overhead wheels 162 and overhead wheel arms 164. Here any well-known technology for suspended transport along a cable, rail, or raceway may be used.

The grommets 118 are positioned at a height (in the positive Z-axis direction) such that the system of the bicycle 50 and the rider 56 is stable in the Y-axis direction. That is, at least one, and preferably both, of the grommets 118 are positioned higher than the center of gravity of the system 10 of the bicycle 50 and the rider 56, such that there is no danger of tipping or falling of the bicycle and rider in the Y-axis direction, that is, to the left or the right of the rider. This is preferred to provide lateral-direction (Y-axis direction) stability, because the vertical suspension members 160 may be cables or wires which are not rigid, and also because the attachment of the vertical suspension members 160 to the grommets 118 is not rigid.

The dimensions of the connection members 100, vertical suspension members 160, overhead wheel arms 164, and overhead wheels 162, and the height of the overhead cable 200 above the ground, are such that the wheels 58 of the bicycle 50 are always raised up off the ground, preferably at a height of from 10 cm to 40 cm. This height is sufficient to prevent the bicycle from colliding with small objects on the ground, but is not so great as to constitute a significant danger to the rider 56. By this structure, the motion of the bicycle 50 and the rider 56 is constrained to the path of the overhead cable 200, and the wheels 58 of the bicycle 50 do not generally come into contact with obstacles on the ground, such as snow or ice, branches, rocks, and similar, or with irregularities in the road or ground surface such as holes, potholes, and similar.

There is no explicit provision for forward propulsion in this first aspect. However, various known methods of propulsion and braking, some of which are disclosed in the patents incorporated by reference above may be adapted for use in the present elevated bicycle-based transportation system 10.

By means of this first aspect of the present system 10, the rider 56 can ride the bicycle 50 in the normal mode, with the connection members 100, 100' positioned as shown in FIG. 7 with the telescoping members 114 collapsed or retracted and the auxiliary forks 112 pivoted about the respective wheel axles 62 toward the center of the bike 50, so as not to impede normal riding of the bicycle. Upon reaching the cable 200, the rider deploys the connection members 100, the vertical suspension members 160, and the overhead wheels 162, as shown in FIG. 8, so that the bicycle can be ridden in the suspended mode.

Specifically, the rider 56 stops the bike 50 at a section of the cable 200 which is either low enough to be within reach of most human beings, for example six feet above the ground, or which is positioned over a ramp (not shown) which serves to raise the bicycle 50 and rider 56 to within reach of the cable 200. The rider 56 dismounts, and may use a kickstand (not shown) to keep the bicycle 50 erect. The rider 56 then rotates one of the connection members 100, for example the front connection member 100, so as to be approximately vertical, extends the telescoping member 114, connects a vertical suspension member 160 to the grommet 118 on the telescoping member 114 as previously described, and grasping the overhead wheel arm 164, places the overhead wheel 162 on the cable 200. As a result of this operation, the front bicycle wheel 58 may or may not be lifted off the ground. The rider 56 performs a similar operation using the rear connection member 100', and then mounts the bicycle 50, and rides forward so that the bicycle either is raised up off the ground by the cable 200 or leaves the ramp, and is suspended in air.

In the suspended mode, the bicycle 50 can be ridden with greater safety than in the normal mode, without being affected by adverse road conditions, with less exertion required of the rider, enabling travel at greater speeds than in normal bicycling, and enabling the traversing of low obstructions which could not be traversed by an ordinary bicycle. Moreover, more efficient use of urban space is made, and such a system helps to alleviate traffic congestion.

Figure 9:
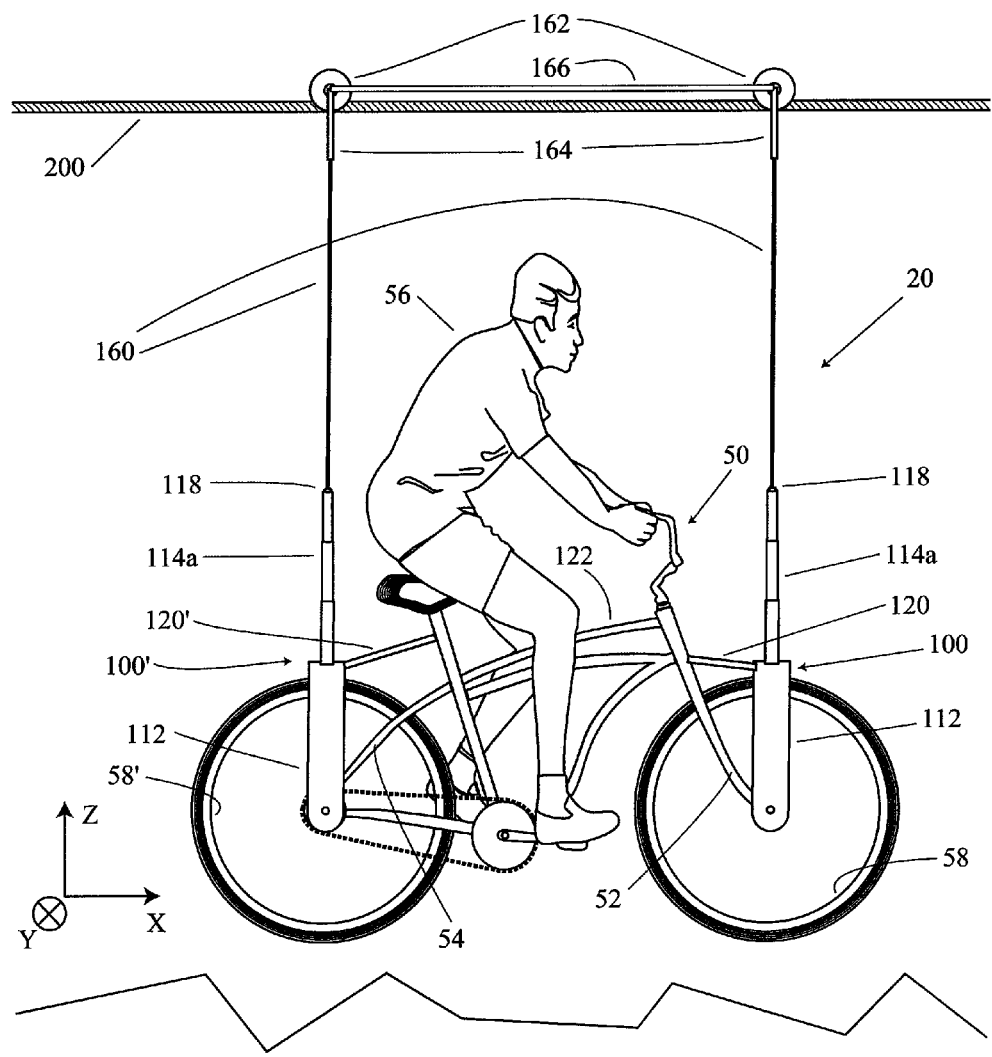
FIG. 9 is a schematic side view of the elevated bicycle-based transportation system of a second aspect of the invention.

Referring now to FIG. 9, a second embodiment of the present elevated bicycle-based transportation system is generally designated 20. Components shared with the system 10 are designated with the same reference numbers. The second system 20 is similar to the system 10, but further includes front and rear struts 120, 120', as well as a wheel separation member 166.

The front and rear struts 120 are detachably attached to the upper ends of the auxiliary forks 112 and to appropriate portions of a frame 122 of the bicycle 50. The struts 120 prevent motion of the connection members 100 in the X-axis and Z-axis directions, pivoting about the respective axles.

In the preferred embodiment, the wheel separation member 166 is a rigid member, each end of which is connected to the overhead wheel arms 164 so as to maintain a constant distance between the overhead wheels 162, without impeding the motion of the overhead wheels 162.

Like the first system 10, there is no explicit provision for forward propulsion in this second aspect. However, various conventional methods of propulsion and braking may be adapted for use in this elevated bicycle-based transportation system, some of which are described in the patents incorporated by reference. By this means, advantageous results similar to those of the first aspect are obtained.

Figure 10:
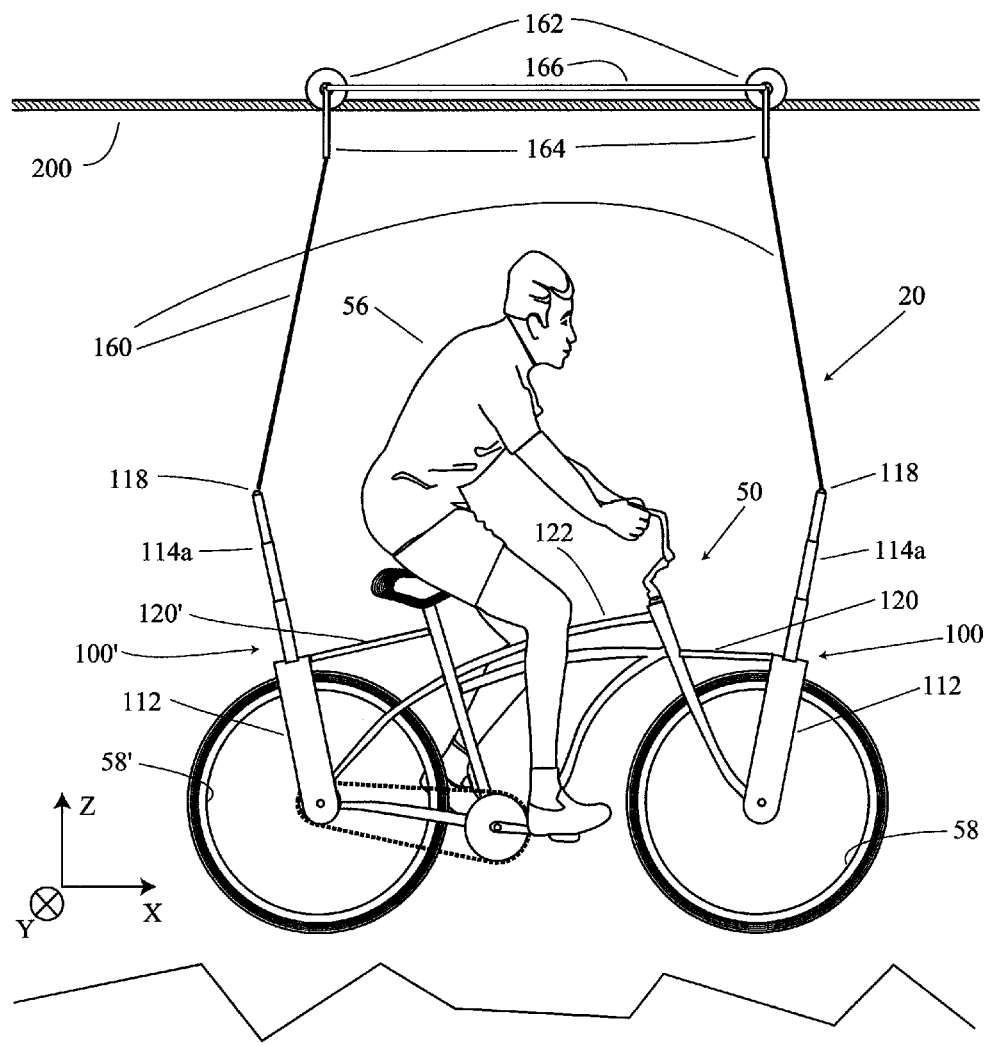
FIG. 10 is a schematic side view of a modified version of the elevated bicycle-based transportation system of the second aspect of the invention.

Referring now to FIG. 10, a modified version of the second system 20 is illustrated. This modified version is different only in that the struts 120 are of lengths such that the connection members 100 are pivoted away from the rider 56. Specifically, in the forward (positive X-axis) direction in the case of the front strut 120, and in the rearward (negative X-axis) direction in the case of the rear strut 120'. As before, the grommets 118 are positioned at a height substantially above the center of gravity of the system 20 of the bicycle and rider. By this means, the vertical suspension members 160 can be displaced away from the rider 56, to provide more comfort and freedom of motion. The struts are preferably adjustable in length, such that the rider 56 can position the connection members 100 and vertical suspension members 160 according to personal preferences.

Again, by this means, advantageous results similar to those of the first aspect are obtained. In addition, greater comfort for the rider, and greater stability in the forward-backward direction (X-axis direction), are obtained.

Figure 11:
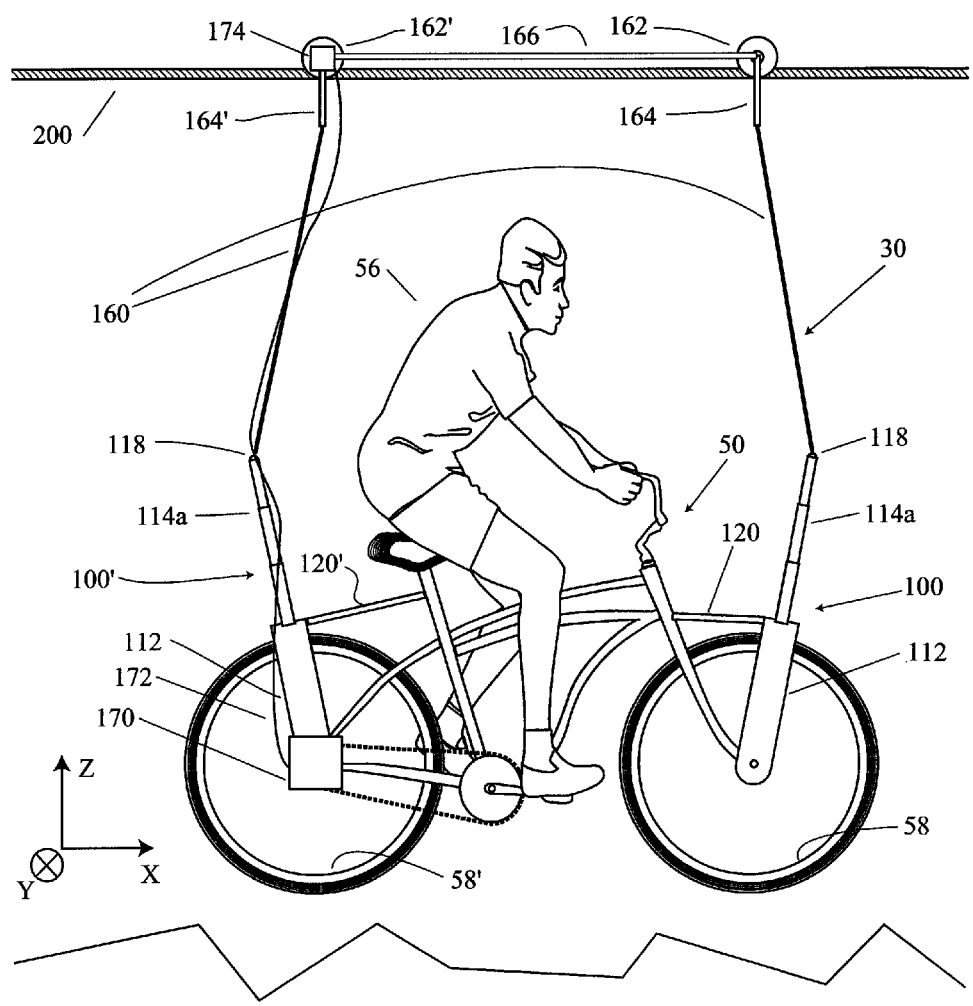
FIG. 11 is a schematic side view of the elevated bicycle-based transportation system of a third aspect of the invention.

Referring now to FIG. 11, a second alternate embodiment of the present elevated bicycle system is generally designated 30. Components shared with the systems 10 and 20 are indicated with identical reference numbers. The third embodiment 30 further includes a propulsion system, having an electric generator 170, an electric wire or conduit 172 connected to the generator, and an electric motor 174 connected to the generator by the wire 172.

In the preferred embodiment, the electric generator 170 is mounted to one side of the rear axle 62, and is also rotatably connected to the rear wheel 58, or to a sprocket or other member fixed to the rear wheel, in such a way that rotational motion of the wheel, caused by pedaling of the bicycle by the rider, is converted into electric power.

The electric motor 174 is preferably mounted on the rear overhead wheel arm 164 and is also rotatably connected to the rear overhead wheel 162, and is provided to use power transmitted by the electric wire 172 to drive the rear overhead wheel 162 in rotation, thereby propelling the overhead wheel 162, and the bicycle and rider, forward (in the positive X-axis direction). By this means, advantageous results similar to those of the first and second aspects are obtained.

Figure 12:
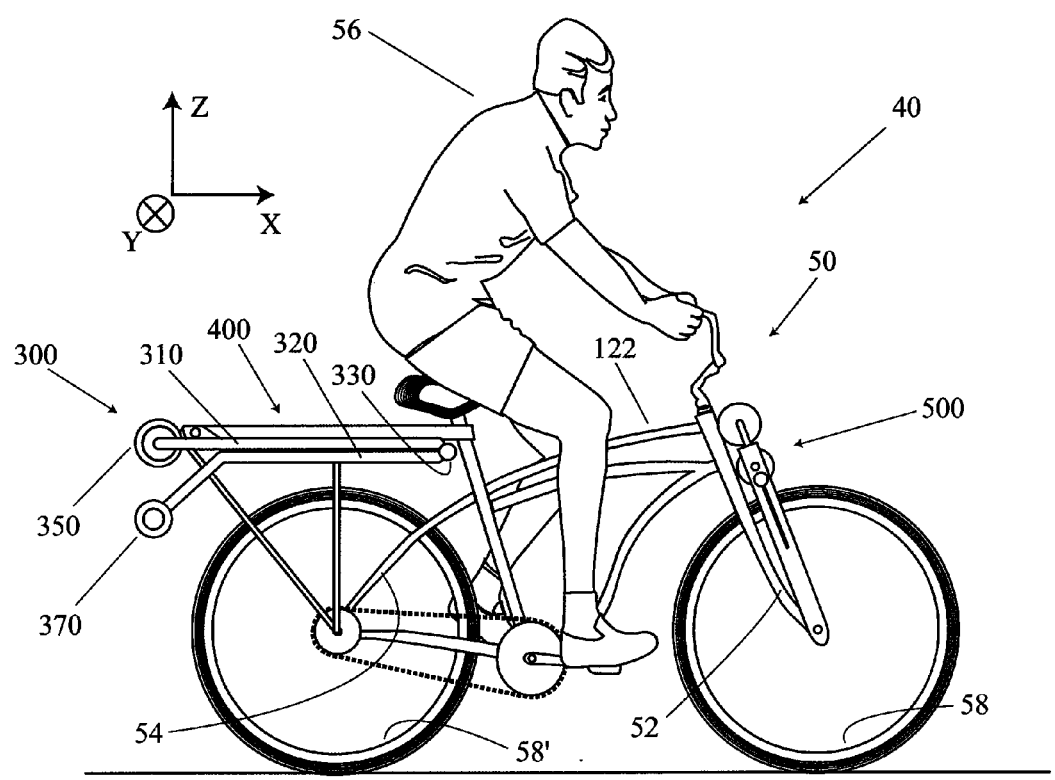
FIG. 12 is a schematic side view of an embodiment of the invention, in which the bicycle is ridden in the normal manner.
Figure 13:
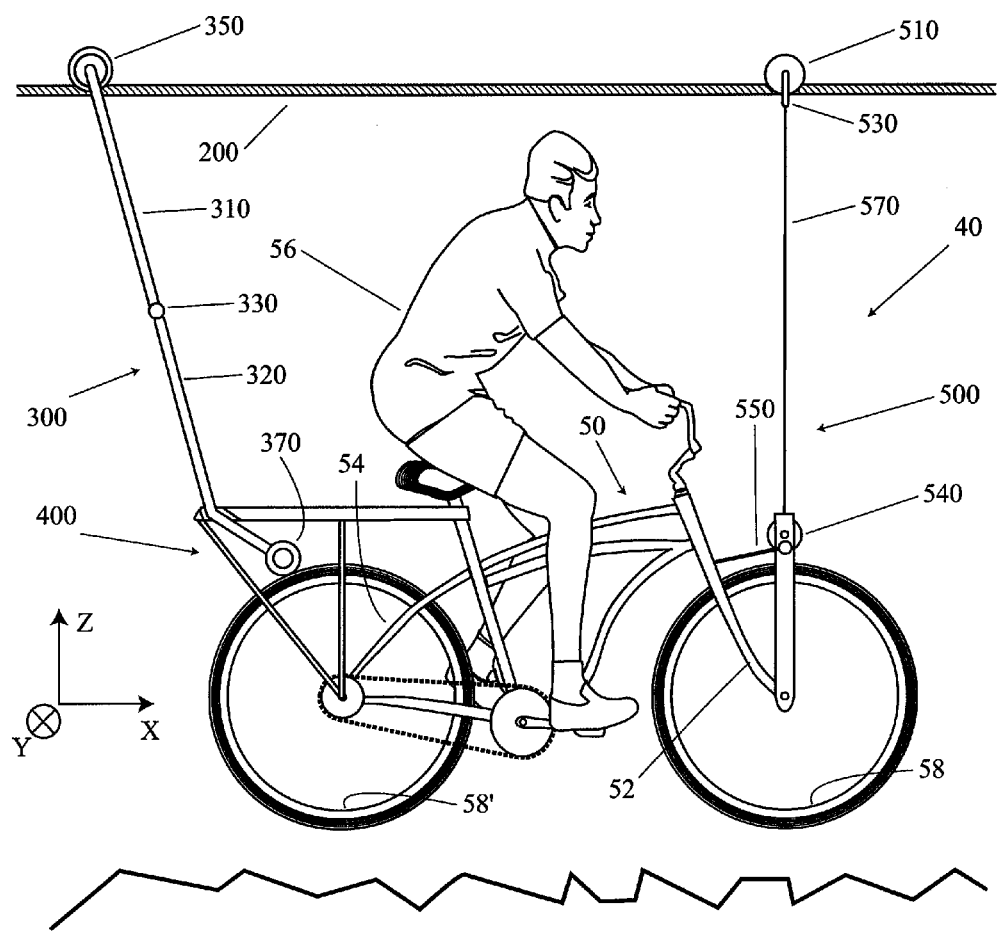
FIG. 13 is a schematic side view of the embodiment of FIG. 12, in which the bicycle is ridden in suspended mode.

Referring now to FIGS. 12 and 13, another alternate embodiment of the present system is generally designated 40. Components shared with the systems 10, 20 and 30 are designated with identical reference numbers. In this system, the bicycle 50 is equipped with a rigid arm 300; a rear rack 400; and a front suspension assembly 500. The rigid arm 300 and rear rack 400 together are equivalent to the rear suspension member 160 of the first aspect, and the front suspension assembly 500 is equivalent to the front suspension member 160 of the first aspect.

Figure 14:
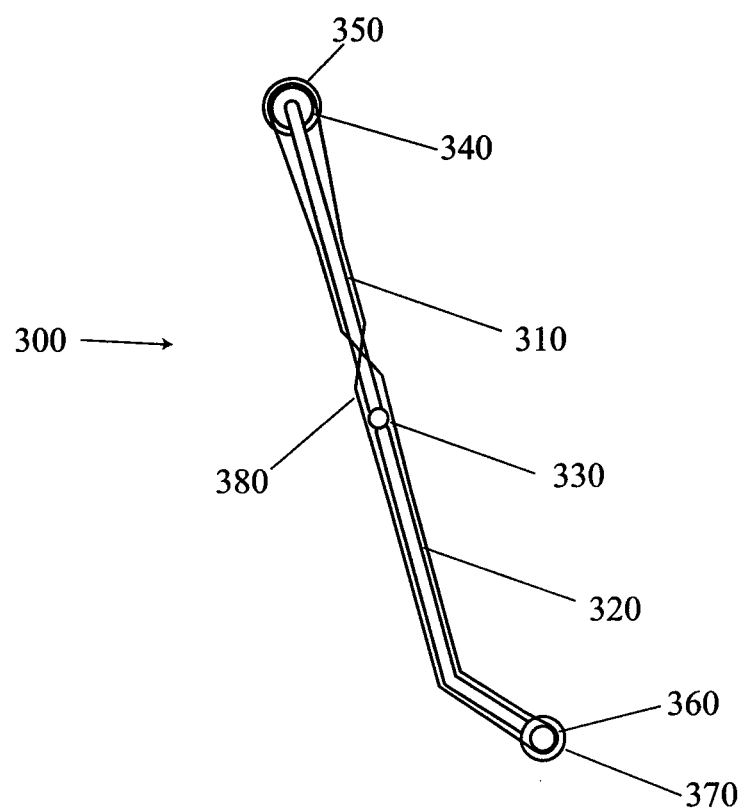
FIG. 14 is a side view of a rigid arm employed in the embodiment of FIG. 12.
Figure 15:
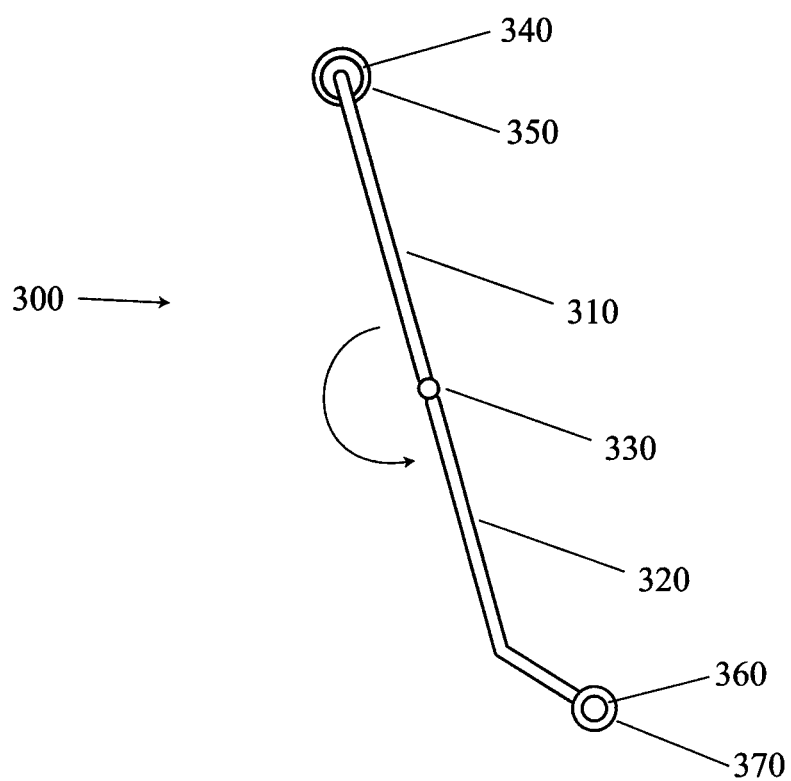
FIG. 15 is a side view of the rigid arm of FIG. 14 in further detail.
Figure 16:
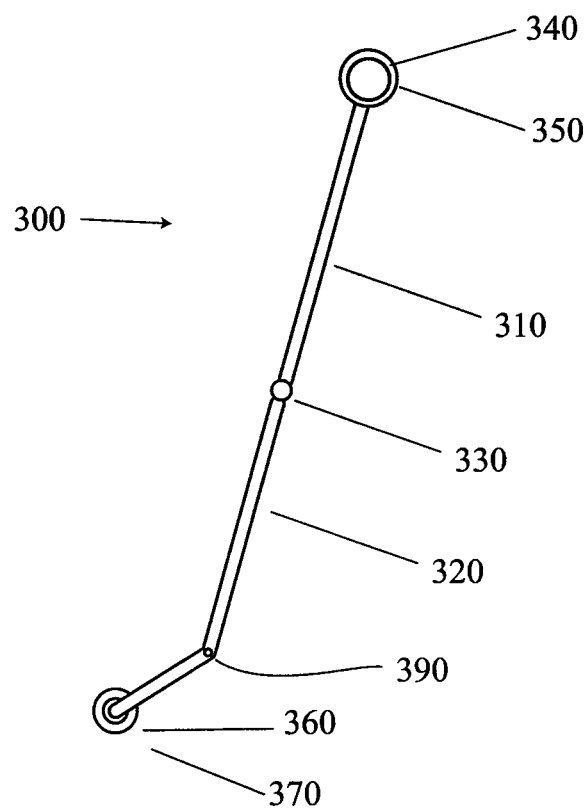
FIG. 16 is a side view of the rigid arm of FIG. 14 in another position.

As shown in FIG. 14, FIG. 15, and FIG. 16, the rigid arm 300 includes an upper arm 310, a lower arm 320, an arm hinge 330, an upper arm sprocket 340, a rear driving wheel 350, a lower arm sprocket 360, a tire-abutting roller 370, and a driving cable 380. In FIG. 16, the driving cable 380 is omitted for simplicity. The driving cable 380 is held in place by a plurality of cable stays, not shown.

The upper arm 310 and lower arm 320 are rigid members formed from an appropriate material such as an aluminum alloy or the like, and combine strength and light weight. The upper arm 310 and lower arm 320 are rotatably connected by the arm hinge 330, which enables rotation as indicated by the arrow in FIG. 16, but does not enable rotation in the opposite direction beyond the state shown in FIG. 16.

The upper arm sprocket 340 is preferably formed integrally with the rear driving wheel 350, and both are rotatably connected to the upper arm 310. Separately assembled wheels and sprockets are also contemplated. The rear driving wheel 350 is designed to travel with stability on an overhead track.

The tire-abutting roller 370 preferably includes an aluminum alloy cylinder covered with a covering of rubber or another material having a high coefficient of static friction with a typical bicycle tire. The lower arm sprocket 360 is fastened onto the tire-abutting roller 370, and both are rotatably connected to the lower arm 320. The driving cable 380 is wrapped at least once around both the upper arm sprocket 340 and the lower arm sprocket 360, such that, when the tire-abutting roller 370 is driven in rotation by the rear wheel of the bicycle, the lower arm sprocket is driven in rotation, thereby causing the driving cable 380 to be drawn so as to drive the upper arm sprocket 340, thereby driving the rear driving wheel 350, thereby propelling the rigid arm 300, and consequently the bicycle 50 and the rider 56, in the forward direction. As shown in FIG. 14, the driving cable is caused by the plurality of cable stays, not shown, to cross over, in order that normal pedaling of the bicycle 50 causes the bicycle and the rider 56 to be propelled in the forward direction, rather than in the backward direction.

As shown in FIG. 16, the rigid arm 300 further includes a pivot shaft 390, preferably substantially cylindrical in shape, firmly connected to and protruding outward from the lower arm 320 in the positive Y direction when the rigid arm 300 is deployed on the bicycle 50 as shown in FIG. 14.

Figure 17:
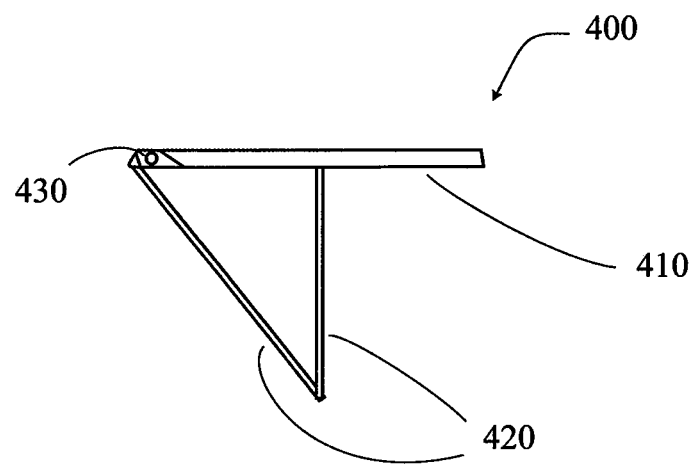
FIG. 17 is a side view of a rear rack employed in the embodiment of FIG. 12.
Figure 18:
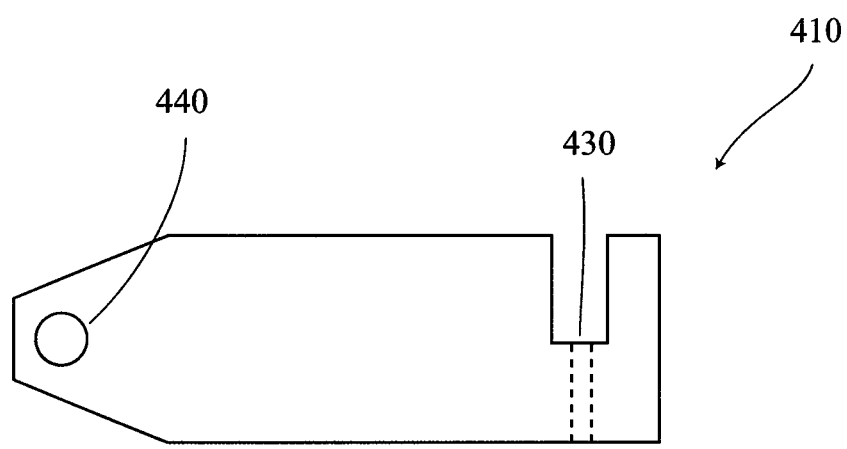
FIG. 18 is a top view of the rear rack of FIG. 17.

The rear rack 400 is similar to an ordinary rear bicycle rack such as is used for carrying objects while riding a bicycle, but is designed to have greater strength and durability, so as to be capable of supporting the weight of the bicycle 50 and the rider 56. As shown in FIG. 17, the rear rack 400 includes a rack body 410, and a plurality of struts 420 on each side, left and right, of the rear wheel 58' of the bicycle 50. The rack body 410 has a horizontal penetrating hole 430, and a vertical seat post hole 440 (FIG. 18). As shown in FIG. 18 which is a top view of the rack body 410, the width of the rack 400 is narrowed substantially at the position of the penetrating hole 430, such that one end of the penetrating hole 430 is positioned substantially at the center of the rack body 410.

Similarly to an ordinary bicycle rack, the rear rack 400 is installed on the bicycle 50 by passing the rear axle through the holes in the lower ends of the struts 420 on both the left and right sides, and passing the seat post of the bicycle frame 122 through the seat post hole 440. The various members and portions of the rear rack 400 should be tightened such that there is little or no mechanical play, particularly in the lateral (Y) direction.

The rigid arm 300 is deployed by rotating the upper arm 310 or the lower arm 320 about the arm hinge 330, so as to assume the state shown in FIG. 14 or FIG. 15 in which the upper arm 310 and lower arm 320 are substantially collinear, and then, with the rigid arm 300 oriented with the upper arm 310 above, the lower arm 320 below, and the pivot shaft 390 extending leftward (in the positive Y direction), sliding the pivot shaft 390 into the penetrating hole 430 of the rack body 410. The pivot shaft 390 is inserted such that the tip of the pivot shaft 390 passes through the penetrating hole 430, and is secured in its position of mating with the penetrating hole 430 by any appropriate fastener technology, such as a screw or a cotter pin, not shown.

When, as shown in FIG. 13, the rear driving wheel 350 is placed on the track 200, which in this embodiment is one-quarter-inch galvanized aircraft cable, the weight of the bicycle 50 or of the bicycle and rider 56 gives rise to a reaction force which tends to rotate the rigid arm 300 in the clockwise direction, as viewed in FIG. 13, about the pivot shaft 390, and consequently the lower arm 320 presses the tire-abutting roller 370 firmly against the rear tire of the bicycle. As a result, when the rider 56 pedals the bicycle 50, causing the rear tire to rotate in the clockwise direction as viewed in FIG. 13, the tire-abutting roller 370 is driven in the counterclockwise direction, thereby driving the driving cable 380 which, because of the cable crossover shown in FIG. 14, drives the rear driving wheel 350 in the clockwise direction, to propel the rigid arm 300, and therefore the bicycle and rider, in the forward direction, which is the positive X direction.

In its deployed state, the rigid arm 300 is rigid in the lateral or Y direction, so that the bicycle 50 and the rider 56 do not tip over to the left or to the right. Braking is effected by using an ordinary hand brake to halt the motion of the rear tire, thereby stopping the motion of the tire-abutting roller 370, the driving cable 380, and the rear driving wheel 350, to halt the motion of the rigid arm 300, and therefore halt the motion of the bicycle and rider.

Figure 19:
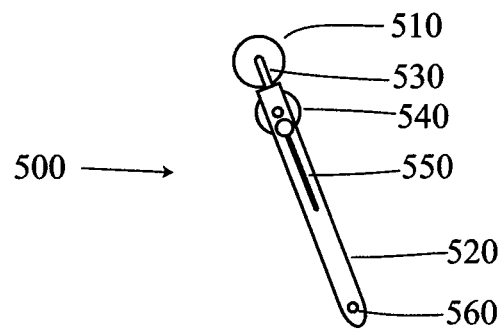
FIG. 19 shows a front suspension assembly employed in the embodiment of FIG. 12.
Figure 20:
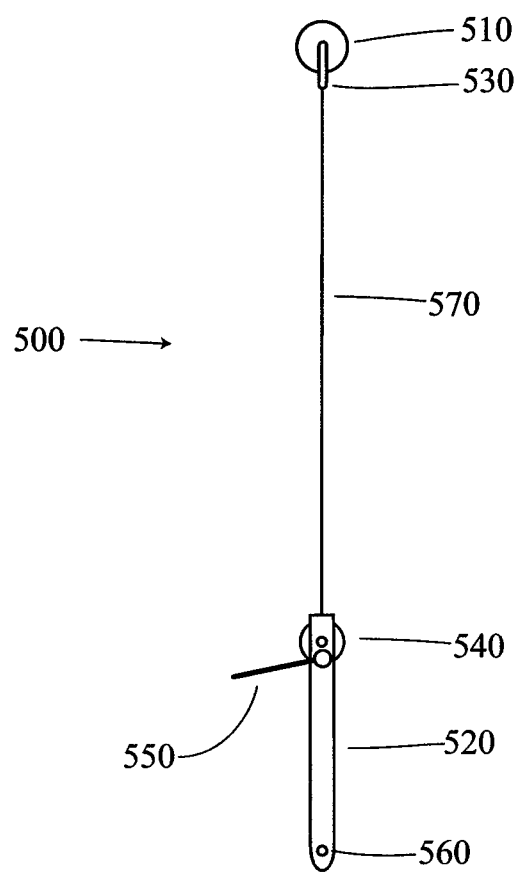
FIG. 20 is a side view of the front suspension assembly of FIG. 21 in the extended position; and, FIG. 21 is a side view of the rigid arm of FIG. 14, in collapsed mode for storage.

As shown in FIG. 19 and FIG. 20, the front suspension assembly 500 includes a front wheel 510, an assembly fork 520, a wheel connector 530, a cable spool 540, a strut 550, penetrating holes 560, and a suspension cable 570. The front wheel 510 is designed to travel with stability on the overhead track, and is rotatably connected to the wheel connector 530. The wheel connector 530 is connected to one end of the suspension cable 570; the other end of the suspension cable 570 is connected to the cable spool 540. The cable spool 540 has a tensioning mechanism, not shown, acting to cause the suspension cable 570 to be wound onto the cable spool 540 when not under tension. The cable spool 540 is mounted on the upper end of the assembly fork 520. The assembly fork 520 is similar to the front fork of an ordinary bicycle, having one penetrating hole 560 at the bottom end of each of the left and right halves, through which the front axle of the bicycle is passed. At least one strut 550 is rotatably mounted on the assembly fork 520.

With the front suspension assembly 500 in the deployed state, shown in FIG. 13 and FIG. 20, the front wheel 510 and wheel connector 530 are pulled upwards and away from the assembly fork 520, under tension sufficient to overcome the tensioning mechanism of the cable spool 540, causing the suspension cable 570 to be paid out. The front wheel 510 is mounted on the overhead track, and the strut 550 is rotated such that one end can abut the bicycle frame, and specifically the head tube of the bicycle frame. The strut 550 may be fixed in place abutting the head tube by suitable means, such as providing a fixture on the head tube into which the end of the strut 550 can be fitted.

When the rigid arm 300 and the front suspension assembly 500 in the deployed state, and with the rear driving wheel 350 and front wheel 510 mounted on the overhead track, the bicycle 50 can be ridden in suspended mode. The rigid arm 300 is rigid in the lateral (Y) direction, thus preventing tipping of the bicycle and rider. The rider 56 pedals the bicycle 50 in the normal way to propel the bicycle forward, as described above, and can use a hand brake or other brake to brake the rear tire of the bicycle, thereby braking the rear driving wheel 350, as described above.

Figure 21:
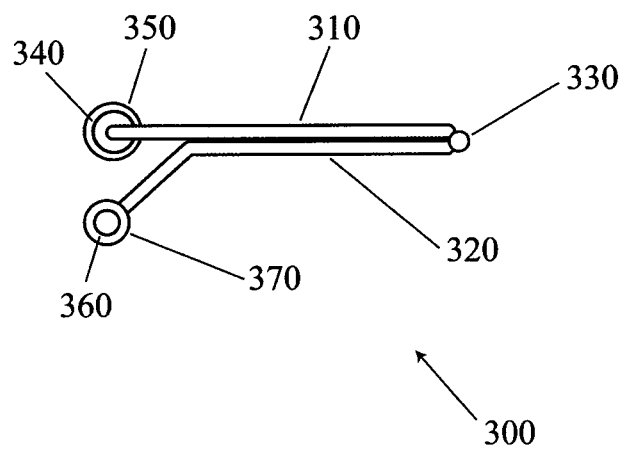

After removing the rear driving wheel 350 and front wheel 510 from the track, the rigid arm 300 and the front suspension assembly 500 can be stored as follows. The rigid arm 300 is detached from the bicycle by sliding the rigid arm 300 rightward (in the negative Y direction), after first detaching any screw, cotter pin, or similar used to hold the pivot shaft 390 in place. Then, the upper arm 310 is rotated about the arm hinge 330 relative to the lower arm 320, in the direction of the arrow in FIG. 15, so that the rigid arm assumes the more compact shape shown in FIG. 21, and can be stowed below the rack body 410 of the rear rack 400, as shown in FIG. 12, secured beneath the rack body 410 by appropriate means.

The front suspension assembly 500 can be stored by rotating the strut 550 so as to be substantially parallel to the assembly fork 520, and allowing the tensioning mechanism of the cable spool 540 to cause the suspension cable 570 to be wound onto the cable spool 540. The assembly fork 520 can then be rotated about the front axle of the bicycle to rest against the head tube of the bicycle frame, and secured thereagainst by appropriate means.

In the above, several aspects of an elevated bicycle-based transportation system of the invention have been explained. However, various modifications will be evident to any person skilled in the art.

For example, instead of an overhead cable 200, which in the absence of a bicycle or other load typically forms a catenary curve between supports, a rigid rail or raceway may be used as the track. By using a rigid rail or raceway, the periodic vertical motion of bicycle and rider which would be experienced when riding along an overhead cable forming a catenary curve or other curve would be eliminated, for a more pleasant and efficient riding experience.

Moreover, in the three aspects described above, connection members were mounted on the front and rear axles of the bicycle; but connection members may instead be mounted on appropriate portions of the bicycle frame, such as on the seat stay, top tube, or head tube.

Moreover, in the aspects described above, no provisions for braking have been described; but braking means of the prior art may easily be adapted for use in a modified bicycle or elevated bicycle-based transportation system of this invention.

Moreover, in the three aspects described above, vertical suspension members 160 are attached to connection members 100 mounted on the bicycle; but connection members 100 may be designed to be connected directly to the rolling, gliding, or sliding members on the overhead track, so long as the lower portions of the connection members 100 are sufficiently stiff as to prevent tipping in the lateral (Y-axis) direction, as described above.

Moreover, in the three aspects described above, overhead wheels 162 are used to support the bicycle on the cable 200 or other track; but any other rolling, gliding, or sliding members, such as bearings, magnets, lubricated sliders or other surfaces, and similar, may be used, either directly in contact with the cable, rail or raceway, or floating thereabove by means of a magnetic or electrostatic field, or a lubricant layer, or a cushion of air, or similar.

Moreover, in the aspects described above, two connection members 100 are installed on the bicycle; but three or a greater number of connection members may be installed where deemed necessary or appropriate.

Moreover, in the aspects described above, the power source for propulsion of the bicycle and rider either was not specified, or was described as derived from the power imparted to the bicycle pedals by the rider; but other power sources, such as solar power, or electric power supplied from the track, or a battery, or an internal combustion engine, or a fuel cell, may be employed as power sources to propel the bicycle 50 and the rider 56.

Moreover, in the aspects described above, an ordinary or traditional upright bicycle 50 was assumed in descriptions of the invention; but this invention can be applied to a wide range of unconventional or specialized bicycles, such as recumbent bicycles, tandem bicycles, tricycles, and electric bicycles.

In the aspects described above, no detailed description has been given of the track used in the elevated bicycle-based transportation system of the invention; but in order to maximize the enhanced safety that is a principal feature of this invention, tracks should be designed so as to prevent or minimize contact of bicycles and bicycle riders with motor vehicles. In particular, it is preferable that a track be positioned, where possible, over terrain that is rough or otherwise unsuited to motor vehicle traffic, thereby reducing the possibility of contention of motor vehicles and the modified bicycles of this system for the same space.

It should be understood that various additions, modifications, and improvements can be made to the invention as described herein by a person skilled in the art, and that such additions, modifications, and improvements are to be regarded as encompassed within the scope of the invention.

What is claimed is:

1. An elevated bicycle-based transportation system, comprising:
    a bicycle;
    a front suspension member, connected to a front portion of said bicycle and having on the upper end a rolling, sliding, or gliding member;
    a rear suspension member, connected to a rear portion of said bicycle and having on the upper end a rolling, sliding, or gliding member;
    an overhead track, which is a supporting member substantially horizontal in orientation, on which said rolling, sliding or gliding members of said front suspension member and rear suspension member rest;
    a front strut, one end of which is connected to said front suspension member, and a rear strut, one end of which is connected to said rear suspension member, such that, by connecting the other ends of each strut to appropriate structural members of said bicycle, motion of said suspension members in the forward/backward direction, which is the direction of said bicycle or the opposite direction, is prevented;
    said front strut and said rear strut can be adjusted so as to adjust the angles of said suspension members with respect to the vertical direction;
    wherein when said suspension members are not suspended from the overhead track, said bicycle can be used in contact with a substrate surface;
    said suspension members are of such lengths, relative to a height relative to a substrate of said overhead track, dimensions of said bicycle, and positions of connection to said bicycle of said front and rear suspension members, that tires of said bicycle are raised off the substrate, so that said bicycle can travel, suspended in air and bearing a human bicycle rider by means of said front and rear suspension members, along said overhead track; and,
    when said bicycle is used on the substrate, at least one among said front suspension member and said rear suspension member can be retracted, collapsed, folded, pivoted, detached, or otherwise modified by a simple operation, to assume a less prominent position which does not impede use of the bicycle on the substrate.

2. The elevated bicycle-based transportation system according to claim 1, further comprising a power transmission system, which transmits power from a wheel of said bicycle either to a rolling, sliding, or gliding member of a suspension member, and wherein said bicycle is propelled forward, together with the rider and said front and rear suspension members, along said overhead track, by pedaling the pedals of the bicycle.

3. The elevated bicycle-based transportation system according to claim 2, wherein at least one among said front suspension member and said rear suspension member is rigid in a lateral direction, which is a horizontal direction perpendicular to a direction of the track.

4. The elevated bicycle-based transportation system according to claim 2, wherein said front suspension member and said rear suspension member are connected to the axle of the front wheel of said bicycle and to the axle of the rear wheel of said bicycle, respectively.

5. The elevated bicycle-based transportation system according to claim 2, further comprising a front strut, one end of which is connected to said front suspension member, and a rear strut, one end of which is connected to said rear suspension member, such that, by connecting the other ends of each strut to appropriate structural members of said bicycle, motion of said suspension members in the forward/backward direction, which is the direction of travel of said bicycle or the opposite direction, is prevented.

6. A connection apparatus, for installation on a bicycle, comprising a plurality of connection members, which can be installed on a bicycle to either permanently connect, or facilitate easy temporary connection of, front and rear suspension members, enabling use of said bicycle in the elevated bicycle-based transportation system according to claim 2, without impeding use on a substrate.

7. The elevated bicycle-based transportation system according to claim 1, wherein at least one among said front suspension member and said rear suspension member is rigid in a lateral direction, which is a horizontal direction perpendicular to a direction of the track.

8. The elevated bicycle-based transportation system according to claim 7, wherein said front suspension member and said rear suspension member are connected to the axle of the front wheel of said bicycle and to the axle of the rear wheel of said bicycle, respectively.

9. The elevated bicycle-based transportation system according to claim 7, further comprising a front strut, one end of which is connected to said front suspension member, and a rear strut, one end of which is connected to said rear suspension member, such that, by connecting the other ends of each strut to appropriate structural members of said bicycle, motion of said suspension members in the forward/backward direction, which is the direction of travel of said bicycle or the opposite direction, is prevented.

10. A connection apparatus, for installation on a bicycle, comprising a plurality of connection members, which can be installed on a bicycle to either permanently connect, or facilitate easy temporary connection of, front and rear suspension members, enabling use of said bicycle in the elevated bicycle-based transportation system according to claim 7, without impeding use on a substrate.

11. The elevated bicycle-based transportation system according to claim 1, wherein said front suspension member and said rear suspension member are connected to the axle of the front wheel of said bicycle and to the axle of the rear wheel of said bicycle, respectively.

12. The elevated bicycle-based transportation system according to claim 11, further comprising a front strut, one end of which is connected to said front suspension member, and a rear strut, one end of which is connected to said rear suspension member, such that, by connecting the other ends of each strut to appropriate structural members of said bicycle, motion of said suspension members in the forward/backward direction, which is the direction of travel of said bicycle or the opposite direction, is prevented.

13. A connection apparatus, for installation on a bicycle, comprising a plurality of connection members, which can be installed on a bicycle to either permanently connect, or facilitate easy temporary connection of, front and rear suspension members, enabling use of said bicycle in the elevated bicycle-based transportation system according to claim 11, without impeding use on a substrate.

14. The elevated bicycle-based transportation system according to claim 1, wherein the rolling, sliding, or gliding member of said front suspension member, and the rolling, sliding, or gliding member of said rear suspension member, are the same member.

15. A connection apparatus, for installation on a bicycle, comprising a plurality of connection members, which can be installed on a bicycle to either permanently connect, or facilitate easy temporary connection of, front and rear suspension members, enabling use of said bicycle in the elevated bicycle-based transportation system according to claim 1, without impeding use on a substrate.

16. A connection apparatus, for installation on a bicycle, comprising a plurality of connection members, which can be installed on a bicycle to either permanently connect, or facilitate easy temporary connection of, front and rear suspension members, enabling use of said bicycle in the elevated bicycle-based transportation system according to claim 1, without impeding use on a substrate.

\* \* \* \* \*